United States Patent
Nakamoto

(10) Patent No.: US 11,860,564 B2
(45) Date of Patent: Jan. 2, 2024

(54) DRIVE TRANSMITTER, DRIVE DEVICE INCORPORATING THE DRIVE TRANSMITTER, AND IMAGE FORMING APPARATUS INCORPORATING THE DRIVE DEVICE

(71) Applicant: Shogo Nakamoto, Kanagawa (JP)

(72) Inventor: Shogo Nakamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 302 days.

(21) Appl. No.: 17/460,960

(22) Filed: Aug. 30, 2021

(65) Prior Publication Data

US 2022/0082983 A1 Mar. 17, 2022

(30) Foreign Application Priority Data

Sep. 15, 2020 (JP) .................................. 2020-154221

(51) Int. Cl.
*G03G 15/00* (2006.01)
*F16D 3/64* (2006.01)

(52) U.S. Cl.
CPC ............. *G03G 15/757* (2013.01); *F16D 3/64* (2013.01)

(58) Field of Classification Search
CPC ......... G03G 15/757; G03G 2221/1657; G03G 21/1647; G03G 15/1615; F16D 3/64
See application file for complete search history.

(56) References Cited

U.S. PATENT DOCUMENTS

| 2,845,809 A | * | 8/1958 | Hetzel | F16H 55/18 74/440 |
| 3,719,103 A | * | 3/1973 | Streander | F16H 55/18 74/447 |
| 2008/0261768 A1 | * | 10/2008 | Miyawaki | G03G 15/757 475/284 |
| 2016/0238981 A1 | * | 8/2016 | Suido | G03G 15/757 |
| 2019/0286017 A1 | * | 9/2019 | Nakamoto | G03G 15/1615 |
| 2020/0063851 A1 | * | 2/2020 | Nakamoto | G03G 15/757 |

FOREIGN PATENT DOCUMENTS

| JP | 2007-040399 | 2/2007 |
| JP | 2016-148381 | 8/2016 |

* cited by examiner

*Primary Examiner* — Francis C Gray
(74) *Attorney, Agent, or Firm* — Harness, Dickey & Pierce, P.L.C.

(57) ABSTRACT

A drive transmitter includes a first member and a second member. The first member includes an opening through which a rotary shaft passes, a wall orthogonal to an axial direction of the first member, and a drive transmitting portion by which a driving force is transmitted. The second member has a rigidity greater than the first member and is configured to be fastened to the first member. A space is between the second member and the first member, with the first member and the second member being overlaid in a fastening direction of the second member, prior to fastening of the first member and the second member. At least a part of the wall of the first member defining the space with the second member is configured to shift toward the second member to reduce a diameter of at least a part of the opening at the fastening.

10 Claims, 7 Drawing Sheets

DRIVE TRANSMITTER, DRIVE DEVICE INCORPORATING THE DRIVE TRANSMITTER, AND IMAGE FORMING APPARATUS INCORPORATING THE DRIVE DEVICE

CROSS-REFERENCE TO RELATED APPLICATION

This patent application is based on and claims priority pursuant to 35 U.S.C. § 119(a) to Japanese Patent Application No. 2020-154221, filed on Sep. 15, 2020, in the Japan Patent Office, the entire disclosure of which is hereby incorporated by reference herein.

BACKGROUND

Technical Field

Embodiments of the present disclosure relate to a drive transmitter, a drive device incorporating the drive transmitter, and an image forming apparatus incorporating the drive device.

Background Art

Drive transmitters are known to include a through-hole through which a rotary shaft passes, a first member including a drive transmitting portion by which a driving force is transmitted, and a second member having a rigidity greater than the first member and being fastened to the first member.

Such a drive transmitter generally includes a resin gear as a first member and a metallic member as a second member to be fastened to the resin gear. The metal member is also provided with a through-hole through which the rotary shaft passes. The inner diameter of the through-hole is made slightly smaller than the outer diameter of the rotary shaft. The drive transmitter is lightly press-fitted to the rotary shaft to be brought into pressure contact with the rotary shaft.

SUMMARY

Embodiments of the present disclosure described herein provide a novel drive transmitter including a first member and a second member. The first member includes an opening through which a rotary shaft passes, a wall disposed orthogonal to an axial direction of the first member, and a drive transmitting portion by which a driving force is transmitted. The second has a rigidity greater than the first member and is configured to be fastened to the wall of the first member. A space is configured to be between the second member and the wall of the first member, with the first member and the second member being overlaid in a fastening direction of the second member, prior to fastening of the first member and the second member. At least a part of the wall of the first member defining the space with the second member is configured to shift toward the second member to reduce a diameter of at least a part of the opening of the first member at the fastening of the first member and the second member.

Further, embodiments of the present disclosure described herein provide a drive device including a drive source, and the above-described drive transmitter configured to transmit a drive force of the drive source.

Further, embodiments of the present disclosure described herein provide an image forming apparatus including the above-described drive device, and a driven target body configured to be driven by the drive device.

BRIEF DESCRIPTION OF THE SEVERAL VIEWS OF THE DRAWINGS

Exemplary embodiments of this disclosure will be described in detail based on the following figures, wherein.

Figure 1:
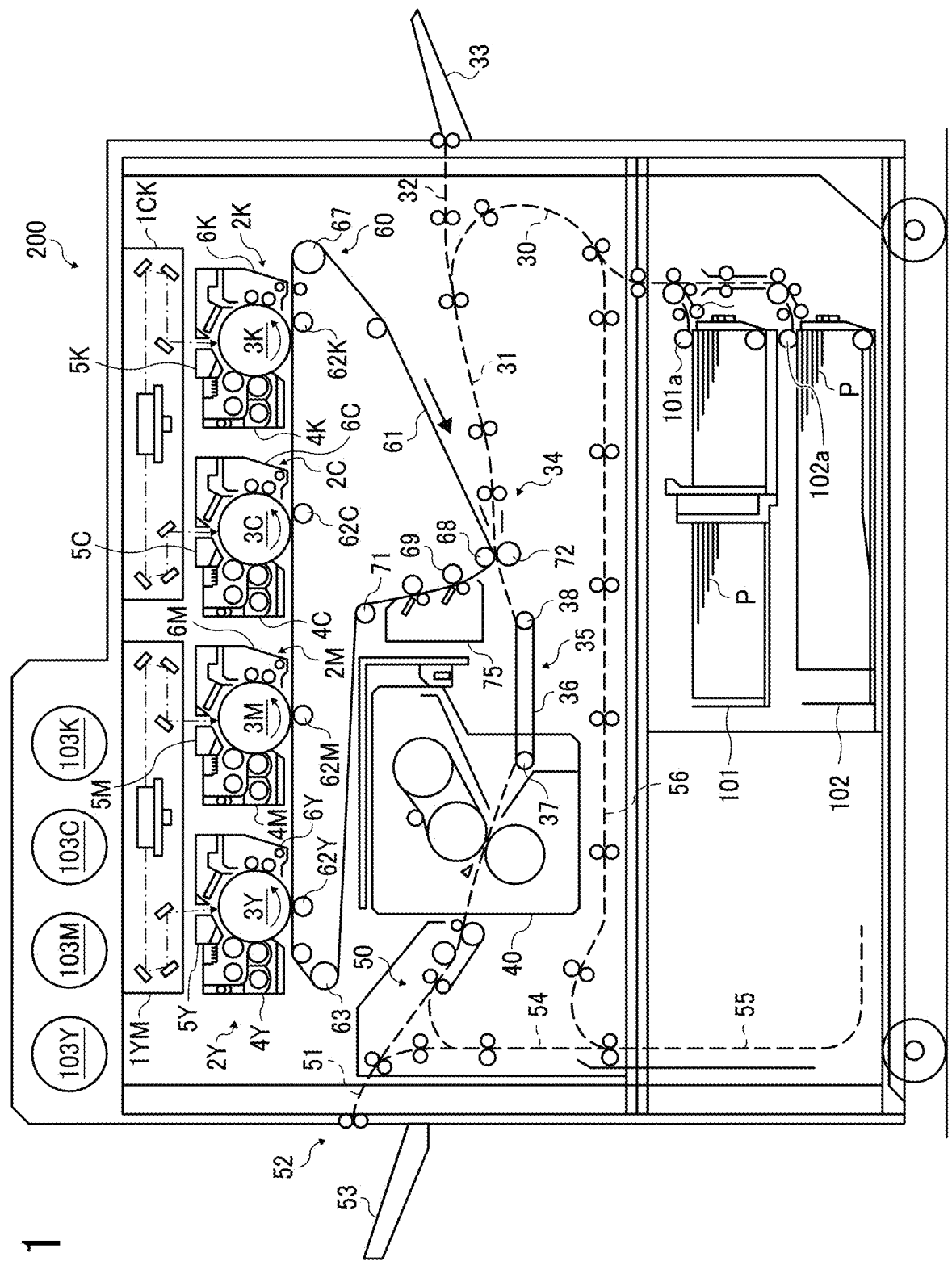
FIG. 1 is a schematic diagram illustrating an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a drive transmitter, a drive device, and an image forming apparatus, according to an embodiment of the present disclosure, with reference to drawings. Note that identical parts or equivalents are given identical reference numerals and redundant descriptions are summarized or omitted accordingly.

As an image forming apparatus including a drive device to which the present disclosure has been applied, one embodiment of an electrophotographic image forming apparatus (hereinafter, referred to as an image forming apparatus 200) will be described below.

First, a description is given of the basic configuration of the image forming apparatus 200 according to the present embodiment.

FIG. 1 is a schematic view of a configuration of the image forming apparatus 200 according to the present embodiment.

The image forming apparatus 200 includes two optical writing devices 1YM and 1CK and four process units Y, 2M, 2C, and 2K to form respective toner images of yellow (Y), magenta (M), cyan (C), and black (K). The image forming apparatus 200 further includes a sheet feed passage 30, a pre-transfer sheet conveyance passage 31, a bypass sheet feed passage 32, a bypass tray 33, a pair of registration rollers 34, a sheet conveyance belt unit 35, a fixing device 40, a conveyance direction switching device 50, a sheet ejection passage 51, a pair of sheet ejecting rollers 52, and a sheet ejection tray 53. The image forming apparatus 200 further includes a first sheet feeding tray 101, a second sheet feeding tray 102, and a sheet re-entry device.

Each of the first sheet feeding tray 101 and the second sheet feeding tray 102 contains a bundle of recording sheets P that function as recording media. The bundle of recording sheets P includes a recording sheet P that functions as a recording medium. The first sheet feeding tray 101 includes a first sheet feed roller 101a and the second sheet feeding tray 102 includes a second sheet feed roller 102a. As a selected one of the first sheet feed roller 101a and the second sheet feed roller 102a is driven and rotated, an uppermost recording sheet P placed on top of the bundle of recording sheets P is fed toward the sheet feed passage 30. The sheet feed passage 30 leads to the pre-transfer sheet conveyance passage 31 that extends to a secondary transfer nip region. The recording sheet P passes through the pre-transfer sheet conveyance passage 31 immediate before the secondary transfer nip region. After being fed from a selected one of the first sheet feeding tray 101 and the second sheet feeding tray 102, the recording sheet P passes through the sheet feed passage 30 and enters the pre-transfer sheet conveyance passage 31.

In addition, the image forming apparatus 200 further includes a housing in which parts and components for image formation are contained. A bypass tray 33 is disposed openably and closably on a side of the housing of the image forming apparatus 200 in FIG. 1. The bundle of recording sheets P is loaded on a top face of the bypass tray 33 when the bypass tray 33 is open with respect to the housing. The uppermost recording sheet P placed on top of the bundle of recording sheets P is fed toward the pre-transfer sheet conveyance passage 31 by the sheet feed roller of the bypass tray 33.

Each of the optical writing devices 1YM and 1CK includes a laser diode, a polygon mirror, and various lenses. Each of the optical writing devices 1YM and 1CK drives the laser diode based on image data of an image that is transmitted from a personal computer. Consequently, respective photoconductors 3Y, 3M, 3C, and 3K of the process units 2Y, 2M, 2C, and 2K are optically scanned, respectively. Specifically, the photoconductors 3Y, 3M, 3C, and 3K of the process units 2Y, 2M, 2C, and 2K are rotationally driven in the counterclockwise direction in FIG. 1.

The optical writing device 1YM emits laser light beams to the photoconductors 3Y and 3M while the photoconductors 3Y and 3M are driving, by deflecting the laser light beams in an axial direction of rotation of the photoconductors 3Y and 3M. Accordingly, respective surfaces of the photoconductors 3Y and 3M are optically scanned and irradiated. Accordingly, an electrostatic latent image based on yellow image data is formed on the photoconductor 3Y and an electrostatic latent image based on magenta image data is formed on the photoconductors 3M.

Further, the optical writing device 1CK emits laser light beams to the photoconductors 3C and 3K while the photoconductors 3C and 3K are driving, by deflecting the laser light beams in an axial direction of rotation of the photoconductors 3C and 3K. Accordingly, respective surfaces of the photoconductors 3C and 3K are optically scanned and irradiated. Accordingly, an electrostatic latent image based on cyan image data is formed on the photoconductor 3C and an electrostatic latent image based on black image data is formed on the photoconductors 3K.

The process units 2Y, 2M, 2C, and 2K include the drum-shaped photoconductors 3Y, 3M, 3C, and 3K, each of which functions as an image carrier (a latent image carrier), respectively. The process units 2Y, 2M, 2C, and 2K include respective units disposed around each of the photoconductors 3Y, 3M, 3C, and 3K as a single unit, respectively. The process units 2Y, 2M, 2C, and 2K are detachably attached to the housing of the image forming apparatus 200. The process units 2Y, 2M, 2C, and 2K have respective configurations identical to each other except the colors of toners, and therefore are occasionally described in a singular form, without suffixes indicating the toner colors, which are yellow (Y), magenta (M), cyan (C), and black (K).

The process unit 2 (i.e., the process units 2Y, 2M, 2C, and 2K) includes the photoconductor 3 (i.e., the photoconductor 3Y, 3M, 3C, and 3K) and a developing device 4 (i.e., developing devices 4Y, 4M, 4C, and 4K) that develops an electrostatic latent image formed on a surface of the photoconductor 3 into a visible toner image. The process unit 2 (i.e., the process units 2Y, 2M, 2C, and 2K) further includes a charging device 5 (i.e., charging devices 5Y, 5M, 5C, and 5K) and a drum cleaning device 6 (i.e., drum cleaning devices 6Y, 6M, 6C, and 6K). The charging device 5 uniformly charges the surface of the photoconductor 3 (i.e., the photoconductors 3Y, 3M, 3C, and 3K) while the photoconductor 3 is rotating. The drum cleaning device 6 removes transfer residual toner remaining on the surface of the photoconductor 3 after passing a primary transfer nip region and cleans the surface of the photoconductor 3.

The image forming apparatus 200 illustrated in FIG. 1 is a tandem image forming apparatus in which the four process units 2Y, 2M, 2C, and 2K are aligned along a direction of movement of an intermediate transfer belt 61 that functions as a driven target body having an endless loop.

The photoconductor 3 (i.e., the photoconductors 3Y, 3M, 3C, and 3K) is manufactured by a hollow tube made of aluminum, for example, with the front face covered by an organic photoconductive layer having photosensitivity. Note that each of the photoconductors 3Y, 3M, 3C, and 3K may include an endless belt.

The developing device 4 (i.e., developing devices 4Y, 4M, 4C, and 4K) develops an electrostatic latent image by a two-component developer including magnetic carrier particles and non-magnetic toner. Hereinafter, the two-component developer is simply referred to as a "developer". Instead of the two-component developer, the developing device 4 may include a one-component developer that does not include magnetic carrier particles. A toner supplier replenishes corresponding color toner to a toner bottle 103 (i.e., toner bottles 103Y, 103M, 103C, and 103K).

The drum cleaning device 6 (i.e., drum cleaning devices 6Y, 6M, 6C, and 6K) in the present embodiment of this disclosure includes a cleaning blade of polyurethane rubber as a cleaning body to be pressed against the photoconductor 3. However, the configuration of the drum cleaning device 6 is not limited to this configuration. In order to enhance the cleaning performance, the image forming apparatus 200 employs a rotatable fur brush to contact the photoconductor 3. The fur brush scrapes a solid lubricant into powder and applies the lubricant powder to the surface of the photoconductor 3.

An electric discharging lamp is disposed above the photoconductor 3. The electric discharging lamp is also included in the process unit 2. Further, the electric discharging lamp optically emits light to the photoconductor 3 to remove electricity from the surface of the photoconductor 3 after passing through the drum cleaning device 6.

The electrically discharged surface of the photoconductor 3 is uniformly charged by the charging device 5. Then, the above-described optical writing device 1YM starts optical scanning. The charging device 5 rotates while receiving the charging bias from a power source. Here, instead of the above-described method, the charging device 5 may employ a scorotron charging system in which a charging operation is performed without contacting the photoconductor 3.

As described above with FIG. 1, the process units 2Y, 2M, 2C, and 2K have an identical configuration to each other.

A transfer device 60 is disposed below the process units 2Y, 2M, 2C, and 2K. The transfer device 60 causes the intermediate transfer belt 61 that is an endless belt wound around multiple support rollers (including rollers 63, 67, 68, 69, and 71) with tension to contact the photoconductors 3Y, 3M, 3C, and 3K. While causing the intermediate transfer belt 61 to be in contact with the photoconductors 3Y, 3M, 3C, and 3K, the intermediate transfer belt 61 is rotated by rotation of one of the multiple support rollers so that the intermediate transfer belt 61 endlessly moves in a clockwise direction. By so doing, respective primary transfer nip region for forming yellow, magenta, cyan, and black images are formed between the photoconductors 3Y, 3M, 3C, and 3K and the intermediate transfer belt 61.

In the vicinity of the primarily transfer nip regions, primary transfer roller are disposed in a space surrounded by an inner circumferential surface of the intermediate transfer belt 61, that is, in a belt loop. The primary transfer rollers 62Y, 62M, 62C, and 62K, each of which functioning a primary transfer body, presses the intermediate transfer belt 61 toward the photoconductors 3Y, 3M, 3C, and 3K. A primary transfer bias is applied by respective transfer bias power supplies to the primary transfer rollers 62Y, 62M, 62C, and 62K. Consequently, respective primarily transfer electric fields are generated in the primary transfer nip region to electrostatically transfer respective toner images formed on the photoconductors 3Y, 3M, 3C, and 3K onto the intermediate transfer belt 61.

As the intermediate transfer belt 61 passes through the primary transfer nip region along the endless rotation in the clockwise direction in FIG. 1, the yellow, magenta, cyan, and black toner images are sequentially transferred at the primary transfer nip region and overlaid onto an outer circumferential surface of the intermediate transfer belt 61. This transferring operation is hereinafter referred to as primary transfer. A four-color superimposed toner image (hereinafter referred to as "four-color toner image") is formed on the outer circumferential surface of the intermediate transfer belt 61 due to the primary transfer by this superimposition.

A secondary transfer roller 72 that functions as a secondary transfer body below the intermediate transfer belt 61 in FIG. 1. The secondary transfer roller 72 contacts a secondary transfer backup roller 68 at a position where the secondary transfer roller 72 faces the secondary transfer backup roller 68 via the outer circumferential surface of the intermediate transfer belt 61, which forms a secondary transfer nip region. By so doing, the secondary transfer nip region is formed between the outer circumferential surface the intermediate transfer belt 61 and the secondary transfer roller 72.

A secondary transfer bias is applied by a transfer bias power supply to the secondary transfer roller 72. By contrast, the secondary transfer backup roller 68 disposed inside the belt loop of the intermediate transfer belt 61 is electrically grounded. As a result, a secondary transfer electric field is formed in the secondary transfer nip region.

The pair of registration rollers 34 is disposed on the right side of FIG. 1. The pair of registration rollers 34 nips and conveys the recording sheet P to the secondary transfer nip region in synchrony with arrival of the four-color toner image formed on the intermediate transfer belt 61 so as to further convey the recording sheet P toward the secondary transfer nip region. In the secondary transfer nip region, the four-color toner image formed on the intermediate transfer belt 61 is secondarily transferred onto the recording sheet P collectively due to action of the secondary transfer electric field and a nip pressure in the secondary transfer nip region. By being mixed with a white color of a surface of the recording sheet P, the four-color toner image is developed to a full-color toner image.

Transfer residual toner that has not been transferred onto the recording sheet P in the secondary transfer nip region remains on the outer circumferential surface of the intermediate transfer belt 61 after the intermediate transfer belt 61 has passed through the secondary transfer nip region. The transfer residual toner is cleaned by a belt cleaning device 75 that is in contact with the intermediate transfer belt 61.

The recording sheet P that has passed through the secondary transfer nip region separates from the intermediate transfer belt 61 to be conveyed to the sheet conveyance belt unit 35. The sheet conveyance belt unit 35 includes a transfer belt 36, a drive roller 37, and a driven roller 38. The transfer belt 36 having an endless belt is wound around the drive roller 37 and the driven roller 38 with taut and is endlessly rotated in the counterclockwise direction in FIG. 1 along with rotation of the drive roller 37. While nipping the recording sheet P that is conveyed from the secondary transfer nip region on the outer circumferential surface (the stretched surface) of the transfer belt 36, the sheet conveyance belt unit 35 forwards the recording sheet P along with the endless rotation of the transfer belt 36 toward the fixing device 40.

The image forming apparatus 200 further includes a sheet reversing device including the conveyance direction switching device 50, a re-entry passage 54, a switchback passage 55, and a post-switchback passage 56. Specifically, after receiving the recording sheet P from the fixing device 40, the conveyance direction switching device 50 switches a direction of conveyance of the recording sheet P, in other words, a direction in which the recording sheet P is further conveyed, between the sheet ejection passage 51 and the re-entry passage 54.

When printing an image on a first face of the recording sheet P and not printing on a second face, a single-side printing mode is selected. When performing a print job in the single-side printing mode, a route of conveyance of the recording sheet P is set to the sheet ejection passage 51. According to the setting, the recording sheet P having the image on the first face is conveyed toward the pair of sheet ejecting rollers 52 via the sheet ejection passage 51 to be ejected to the sheet ejection tray 53 that is attached to an outside of the image forming apparatus 200.

When printing images on both first and second faces of a recording sheet P, a duplex printing mode is selected. When performing a print job in the duplex printing mode, after the recording sheet P having fixed images on both first and second faces is conveyed from the fixing device 40, a route of conveyance of the recording sheet P is set to the sheet ejection passage 51. According to the setting, the recording sheet P having images on both first and second faces is conveyed and ejected to the sheet ejection tray 53.

By contrast, when performing a print job in the duplex printing mode, after the recording sheet P having a fixed image on the first face is conveyed from the fixing device 40, a route of conveyance of the recording sheet P is set to the re-entry passage 54.

The re-entry passage 54 is connected to the switchback passage 55. The sheet P conveyed to the re-entry passage 54 enters the switchback passage 55. Consequently, when the entire region in the sheet conveying direction of the recording sheet P enters the switchback passage 55, the direction of conveyance of the recording sheet P is reversed, so that the recording sheet P is switched back in the reverse direction. The switchback passage 55 is connected to the post-switchback passage 56 as well as the re-entry passage 54. The recording sheet P that has been switched back in the reverse direction enters the post-switchback passage 56. Accordingly, the faces of the recording sheet P is reversed upside down. Consequently, the reversed recording sheet P is conveyed to the secondary transfer nip region again via the post-switchback passage 56 and the sheet feed passage 30. A toner image is transferred onto the second face of the recording sheet P in the secondary transfer nip region. Thereafter, the recording sheet P is conveyed to the fixing device 40 so as to fix the toner image to the second face of the recording sheet P. Then, the recording sheet P passes through the conveyance direction switching device 50, the sheet ejection passage 51, and the pair of sheet ejecting rollers 52 before being ejected on the sheet ejection tray 53.

Figure 2:
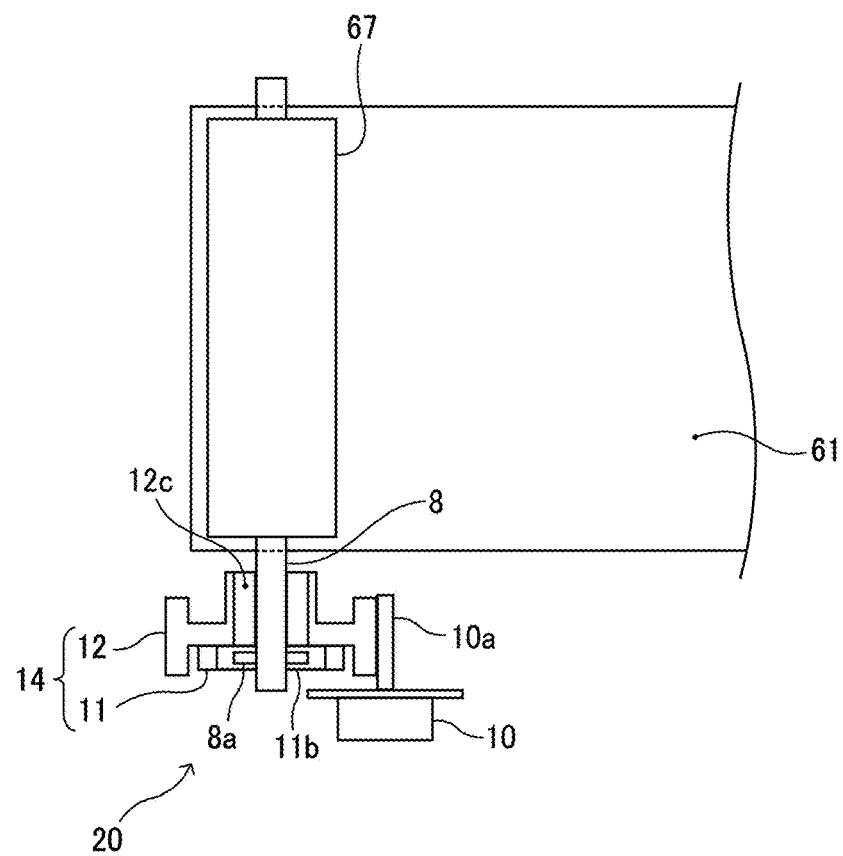
FIG. 2 is a diagram illustrating a schematic configuration of a drive device that drives an intermediate transfer belt.

FIG. 2 is a schematic view illustrating a drive device 20 that drives the intermediate transfer belt 61.

The drive device 20 includes a drive motor 10 and a drive transmitter 14. The drive motor 10 functions as a drive source. The drive transmitter 14 is mounted on a rotary shaft 8 of a drive roller 67. The drive transmitter 14 includes a resin gear 12 and a reinforcement member 11. The resin gear 12 functions as a first member that meshes with a motor gear 10a of the drive motor 10. The reinforcement member 11 functions as a second member made of a sheet metal and having a higher rigidity (higher Young modulus) than the resin gear 12. The reinforcement member 11 is made of a sheet metal and is fastened to the resin gear 12 by screws 13 (see FIG. 3). Each of the screws 13 functions as a fastening member.

A parallel pin 8a is mounted on one end of the rotary shaft 8. The resin gear 12 has slits 12c into which the parallel pin 8a is inserted. The reinforcement member 11 has pin engagement portions 11b each having a slit shape to which the parallel pin 8a is fitted. The drive transmitter 14 is assembled to the rotary shaft 8 so as to rotate integrally with the rotary shaft 8 by passing the parallel pin 8a through the slits 12c of the resin gear 12 and fitting the parallel pin 8a to the pin engagement portion 11b of the reinforcement member 11.

The driving force of the drive motor 10 is transmitted to the resin gear 12 of the drive transmitter 14 via the motor gear 10a. Due to this transmission of the driving force, the drive roller 67 is driven and rotated to rotate the intermediate transfer belt 61. Note that the motor gear 10a is formed by subjecting a metallic motor shaft to, for example, cutting work.

Figure 3A:
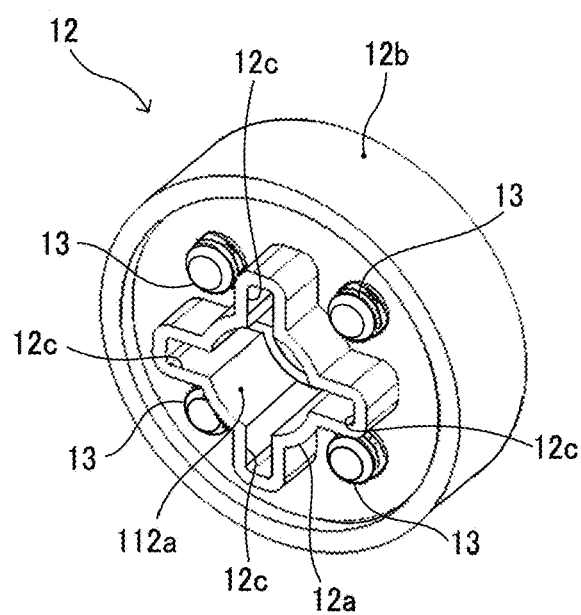
FIGS. 3A and 3B are schematic perspective views of a drive transmitter.
Figure 3B:
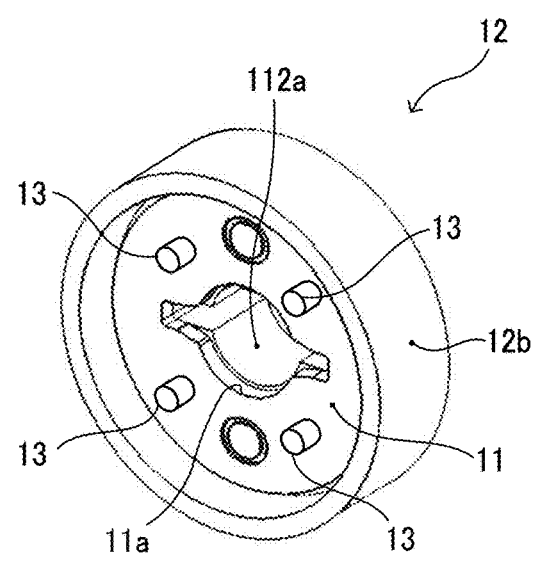

FIGS. 3A and 3B are schematic perspective views of the drive transmitter 14.

Specifically, FIG. 3A illustrates the perspective view of the drive transmitter 14 viewed from the intermediate transfer belt 61 and FIG. 3B illustrates the perspective view of the drive transmitter 14 viewed from the drive motor 10.

The resin gear 12 of the drive transmitter 14 includes a gear portion 12b on the outer circumference. The gear portion 12b functions as a drive transmitting portion. The resin gear 12 includes a hollow tube 12a having a through-hole 12a through which the rotary shaft 8 passes. Further, the hollow tube 12a has slits 12c radially extending at intervals of 90 degrees in the rotational direction of the resin gear 12. The width of each slit 12c (i.e., the length of each slit 12c in the rotational direction) is greater (wider) than the outer diameter of the parallel pin 8a. Note that, instead of the slits 12c, cutouts may be formed in the hollow tube 12a.

The reinforcement member 11 is fastened to the resin gear 12 by the screws 13, each functioning as a fastening member. The reinforcement member 11 also includes a through-hole 11a through which the rotary shaft 8 passes. The through-hole 11a has the pin engagement portions 11b each having a slit shape to which the parallel pin 8a mounted on the rotary shaft 8 is fitted. The pin engagement portions 11*b* are disposed at intervals of 180 degrees.

A large load torque is applied to the intermediate transfer belt 61, for example, when a thick paper enters the secondary transfer nip region. Thus, due to application of such large load torque, a gear included in the drive device 20 is preferably made of metal having a high rigidity (Young's modulus). However, in a case in which the whole gears are made of metal, a hard gear is meshed with another hard gear, which causes an increase in vibration or an increase in noise. Due to such inconvenience, it is not preferable that the whole gears are is made of metal.

In the present embodiment, the motor gear 10*a* is a metallic gear and the gear that meshes with the motor gear 10*a* is the resin gear 12. This arrangement causes the resin gear 12 to absorb meshing vibration between the motor gear 10*a* made of metal and the resin gear 12, thereby restraining occurrence of vibration and noise.

Further, in the present embodiment, the reinforcement member 11 having a relatively high rigidity is fastened to the resin gear 12 having a relatively low rigidity, so as to reinforce the resin gear 12. As a result, when a large load torque is applied to the resin gear 12, distortion (twist) of the resin gear 12 in the rotational direction is restrained, and a decrease in the rotational accuracy is restrained. In addition, by engaging the parallel pin 8*a* with the reinforcement member 11 having a relatively high rigidity, the resin gear 12 is applied with a load torque at a fastening portion at which the reinforcement member 11 is fastened to the resin gear 12. The fastening portion of the reinforcement member 11 and the resin gear 12 is near the gear portion 12*b*. Thus, the radial distance between the portion at which the load torque of the resin gear 12 is applied and the portion at which the driving force of the drive motor 10 is applied distance is shorter in the configuration according to the present embodiment, than in a configuration in which the resin gear 12 is engaged with the parallel pin 8*a*. As a result, distortion (twist) of the resin gear 12 in the rotational direction is prevented, and a decrease in the rotational accuracy is further restrained.

In order to restrain a decrease in the rotational accuracy due to rotational runout of the comparative drive transmitter, a comparative drive transmitter has a configuration in which at least one of the inner diameter of the through-hole 112*a* of the resin gear 12 of the comparative drive transmitter and the inner diameter of the through-hole 11*a* of the reinforcement member 11 is slightly smaller than the outer diameter of the rotary shaft 8, so that the comparative drive transmitter is lightly press-fitted to the rotary shaft 8. If the inner diameter dimension of the through-hole 112*a* is far smaller than the outer diameter dimension of the rotary shaft 8, the comparative drive transmitter is not assembled to the rotary shaft 8 by press-fitting. On the other hand, the inner diameter dimension of the through-hole 112*a* is greater than the outer diameter dimension of the rotary shaft 8, the comparative drive transmitter is not lightly press-fitted to the rotary shaft 8, which generates rotational runout. In order to allow the light press fitting of the drive transmitter, the inner diameter of the through-hole 112*a* needs to be formed accurately. As a result, the manufacturing cost increases.

In order to address this inconvenience, the drive transmitter 14 according to the present embodiment has the configuration in which the inner diameter of the through-hole 112*a* of the resin gear 12 is reduced by fastening the reinforcement member 11 and the resin gear 12. By so doing, the drive transmitter 14 is assembled to the rotary shaft 8 in a state similar to the state in which the drive transmitter 14 is lightly press-fitted to the rotary shaft 8. Next, a description is given of the drive transmitter according to the present embodiment in detail, with reference to the drawings.

Figure 4:
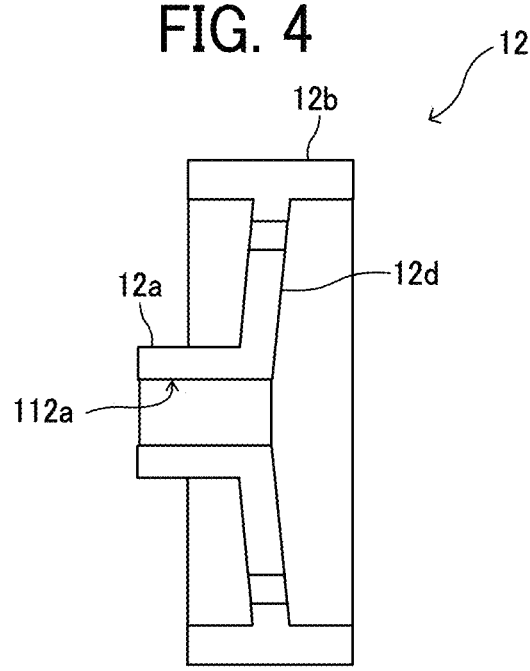
FIG. 4 is a diagram illustrating a schematic configuration of a resin gear according to the present embodiment.

FIG. 4 is a diagram illustrating a schematic configuration of the resin gear 12 according to the present embodiment.

The resin gear 12 of the present embodiment couples the through-hole 112*a* and the gear portion 12*b*. An opposing wall 12*d* facing the reinforcement member 11 is inclined with respect to the fastening direction in which the resin gear 12 and the reinforcement member 11 are fastened to each other. The fastening direction is also the axial direction of the rotary shaft 8. The opposing wall 12*d* is inclined with respect to a direction away from the reinforcement member 11 toward the rotary shaft 8, in other words, inward in the radial direction.

Figure 5A:
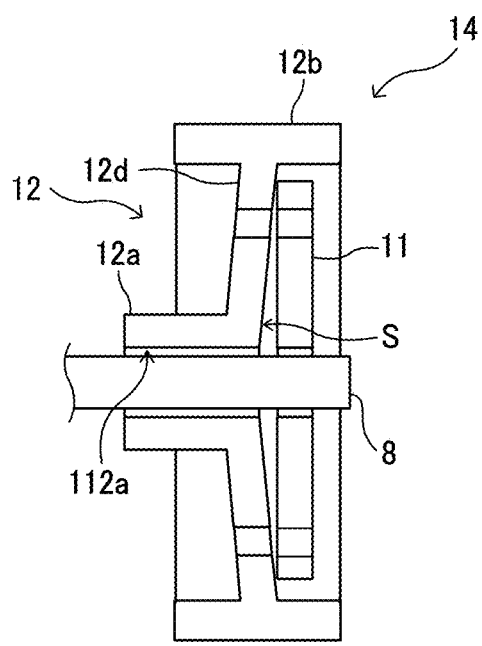
FIG. 5A is a diagram illustrating a state in which the resin gear and a reinforcement member prior to fastening of the resin gear and the reinforcement member.

FIG. 5A is a diagram illustrating a state in which the resin gear 12 and the reinforcement member 11 prior to fastening of the resin gear 12 and the reinforcement member 11.

Figure 5B:
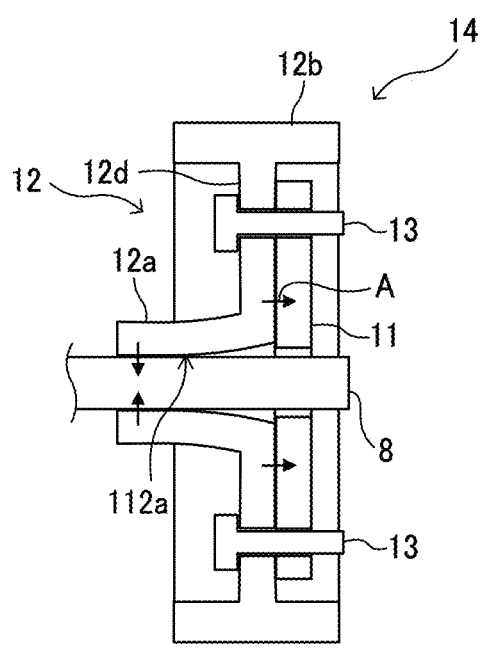
FIG. 5B is a diagram illustrating a state in which the resin gear and the reinforcement member after the fastening of the resin gear and the reinforcement member.

FIG. 5B is a diagram illustrating a state in which the resin gear 12 and the reinforcement member 11 after the fastening of the resin gear 12 and the reinforcement member 11.

As illustrated in FIG. 5A, since the opposing wall 12*d* of the resin gear 12 is inclined, when the resin gear 12 and the reinforcement member 11 are overlaid in the fastening direction, a space S is generated between the reinforcement member 11 and the opposing wall 12*d* of the resin gear 12 in the fastening direction.

As described above, in the present embodiment, the opposing wall 12*d* of the resin gear 12 is inclined with respect to the direction away from the reinforcement member 11 toward the rotary shaft 8 (inward in the radial direction). Due to such a configuration, an end portion (radial outer end portion) of the reinforcement member 11 with respect to the gear portion 12*b* is in contact with the opposing wall 12*d*. As the reinforcement member 11 is brought closer to the rotary shaft 8, the space S between the reinforcement member 11 and the opposing wall 12*d* of the resin gear 12 increases.

Figure 8A:
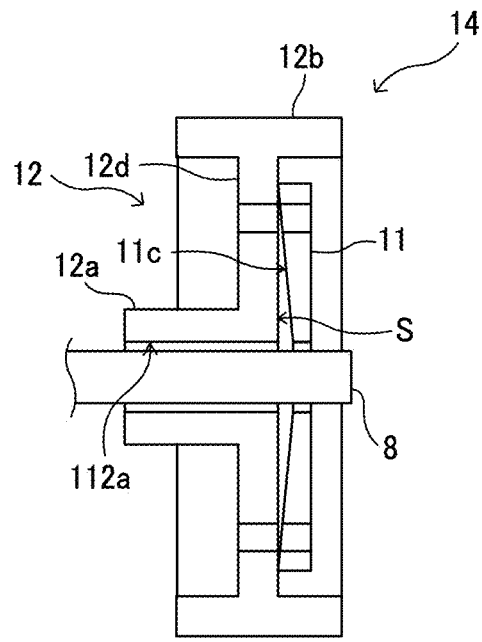
FIGS. 8A and 8B are diagrams, each illustrating a schematic configuration of a drive transmitter of Variation 2.

Further, as illustrated in FIG. 8A, in the state prior to the fastening of the resin gear 12 and the reinforcement member 11, a predetermined space is provided between the rotary shaft 8 and the through-hole 112*a* of the resin gear 12 and another predetermined space is provided between the rotary shaft 8 and the through-hole 11*a* of the reinforcement member 11.

As illustrated in FIG. 5B, as the reinforcement member 11 is fastened to the resin gear 12 with the screws 13 (each functioning as a fastening member), the opposing wall 12*d* of the resin gear 12 having a rigidity lower than the reinforcement member 11 is pressed toward the reinforcement member 11 by the heads of the screws 13 as indicated by arrow A. As a result, as the opposing wall 12*d* of the resin gear 12 moves toward the reinforcement member 11, the resin gear 12 is deformed to decrease the space S. Then, the opposing wall 12*d* of the resin gear 12 follows the reinforcement member 11.

As illustrated in FIGS. 3A and 3B, the hollow tube 12*a* is provided with the (plurality of) slits 12*c*. Due to such a configuration, as the opposing wall 12*d* is deformed to follow the reinforcement member 11, the opposite end portion of the slits 12*c* with respect to the reinforcement member 11 in the fastening direction (axial direction) is deformed to collapse. As a result, the diameter of the hollow tube 12*a* at the opposite end portion of the hollow tube 12*a* with respect to the reinforcement member 11 in the fastening direction (axial direction) is reduced to press against the rotary shaft 8. Further, the opposite end portion of the through-hole 112*a* with respect to the reinforcement member 11 in the fastening direction (axial direction) is deformed to follow the rotary shaft 8. Due to this deformation, the inner circumferential surface of the hollow tube 12*a* is pressed against the rotary shaft 8 with a certain width in the axial direction from the opposite end portion of the hollow tube 12*a* with respect to the reinforcement member 11 in the fastening direction (axial direction). Due to this configuration, vibration of the drive transmitter 14 is restrained, and a decrease in the rotational accuracy is restrained.

In the present embodiment, the fastening force of the screws 13 adjust deformation of the resin gear 12, thereby adjusting the amount of reduction of the diameter of the hollow tube 12*a*. For example, in a case in which the portion having the smallest inner diameter of the through-hole when the resin gear 12 is fastened to the reinforcement member 11 is smaller than the dimension capable of being lightly press-fitted, a reduction in the diameter of the through hole is relaxed by loosening the fastening of the screws 13, and the dimension capable of being lightly press-fitted is obtained. Thus, by adjusting the fastening force of the screws 13, the inner diameter of the through-hole is adjusted. Due to such a configuration, the drive transmitter 14 is lightly press-fitted without forming the inner diameter of the through-hole with accuracy, and therefore the manufacturing cost is reduced.

Further, after the resin gear 12 is inserted into the rotary shaft 8 in a state in which the resin gear 12 is fastened to the reinforcement member 11 to such an extent that the resin gear 12 is not deformed, the screws 13 are fastened to reduce the inner diameter of the through-hole, and the resin gear 12 is pressed against the rotary shaft 8. As described above, in the present embodiment, the drive transmitter does not need to be assembled to the rotary shaft 8 by light press-fitting. Due to this configuration, when compared with a configuration in which the drive transmitter is lightly press-fitted to the rotary shaft 8, the drive transmitter 14 is assembled to the rotary shaft 8 easily. Further, in a case in which the drive transmitter is assembled to the rotary shaft 8 by light press-fitting, the drive transmitter needs to contact the rotary shaft 8 by lightly pressing against the rotary shaft 8 from the viewpoint of the assembly performance. By contrast, in the present embodiment, after being inserted into the rotary shaft 8, the resin gear 12 and the reinforcement member 11 contact the rotary shaft 8 with pressure greater than light pressure in order to fasten the resin gear 12 and the reinforcement member 11 with the screws 13 to press against the rotary shaft 8.

Further, the resin gear 12 having a lower rigidity than the reinforcement member 11 and being easily elastically deformed is pressed against the rotary shaft 8. Therefore, when compared with a configuration in which the reinforcement member 11 is pressed against the rotary shaft 8, the resin gear 12 is pressed against the rotary shaft 8 at the target pressure even with a rough inner diameter dimension.

Note that the gear portion 12*b* of the resin gear 12 has no slits and no space in the rotational direction. Due to such a configuration, it is not likely that deformation of the opposing wall 12*d* increases or decreases the diameter of a part of the resin gear 12. Accordingly, the configuration of the drive transmitter 14 according to the present embodiment restrain or prevent a meshing failure such as partial contact between the gear portion 12*b* of the resin gear 12 and the motor gear 10*a* of the drive motor 10.

Further, in the present embodiment, the end portion of the reinforcement member 11 with respect to the gear portion 12*b* is in contact with the opposing wall 12*d* prior to the fastening of the resin gear 12 and the reinforcement member 11 as illustrated in FIG. 5A. Due to this configuration, the gear portion 12*b* of the resin gear 12 is hardly deformed toward the reinforcement member 11. As a result, deformation of the gear portion 12*b* is further restrained.

Further, in the present embodiment, the resin gear 12 has the slits 12*c* formed in the hollow tube 12*a* at intervals of 90 degrees in the rotational direction. This configuration restrains the opposite end portion of the hollow tube 12*a* with respect to the reinforcement member 11 from collapsing into an oval shape. Accordingly, the through-hole 112*a* is equally pressed against the rotary shaft 8 in the rotational direction.

Next, a description is given of the drive transmitter 14 according to variations of the present embodiment. Each variation is referred to as "Variation".

Variation 1

Figure 6:
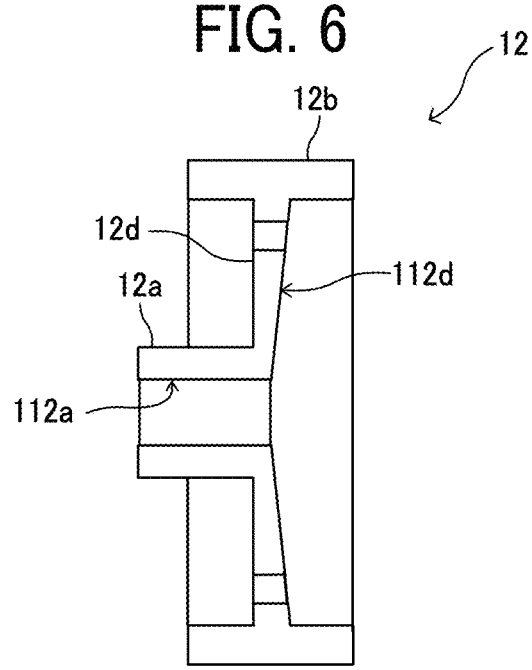
FIG. 6 is a diagram illustrating a schematic configuration of a resin gear of the drive transmitter of Variation 1.

FIG. 6 is a diagram illustrating a schematic configuration of the resin gear 12 of the drive transmitter 14 of Variation 1.

Figure 7A:
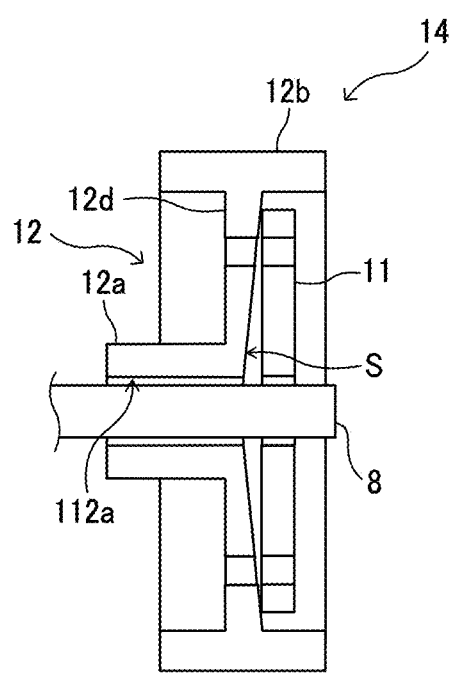
FIG. 7A is a diagram illustrating a state in which the resin gear and a reinforcement member of the drive transmitter of Variation 1, prior to fastening of the resin gear and the reinforcement member.

FIG. 7A is a diagram illustrating a state in which the resin gear 12 and the reinforcement member 11 of the drive transmitter 14 of Variation 1, prior to fastening of the resin gear 12 and the reinforcement member 11.

Figure 7B:
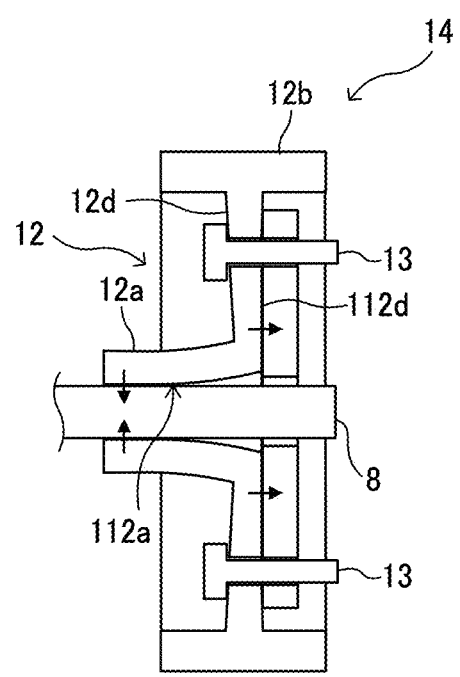
FIG. 7B is a diagram illustrating a state in which the resin gear and the reinforcement member of the drive transmitter of Variation 1, after the fastening of the resin gear and the reinforcement member.

FIG. 7B is a diagram illustrating a state in which the resin gear 12 and the reinforcement member 11 of the drive transmitter 14 of Variation 1, after the fastening of the resin gear 12 and the reinforcement member 11.

As illustrated in FIG. 6, the resin gear 12 of the drive transmitter 14 of Variation 1 includes the opposing wall 12*d* having an opposing face 112*d*. The opposing face 112*d* of the opposing wall 12*d* faces the reinforcement member 11 and is a sloped face inclined with respect to the fastening direction (axial direction). The opposing face 112*d* is inclined to be farther away from the reinforcement member 11 toward the rotary shaft 8.

As in the above-described embodiment, as illustrated in FIG. 7A, the drive transmitter 14 of Variation 1 has the space S between the opposing wall 12*d* of the resin gear 12 and the reinforcement member 11 with respect to the rotary shaft 8, prior to fastening of the resin gear 12 and the reinforcement member 11. Due to the space S, as illustrated in FIG. 7B, the opposing wall 12*d* after the fastening deforms following the reinforcement member 11, the diameter of the hollow tube 12*a* at the opposite end portion of the hollow tube 12*a* with respect to the reinforcement member 11 in the fastening direction (axial direction) is reduced, and then the inner circumferential surface of the hollow tube 12*a* at the opposite end portion of the hollow tube 12*a* with respect to the reinforcement member 11 in the fastening direction (axial direction) is pressed against the rotary shaft 8.

Variation 2

Figure 8B:
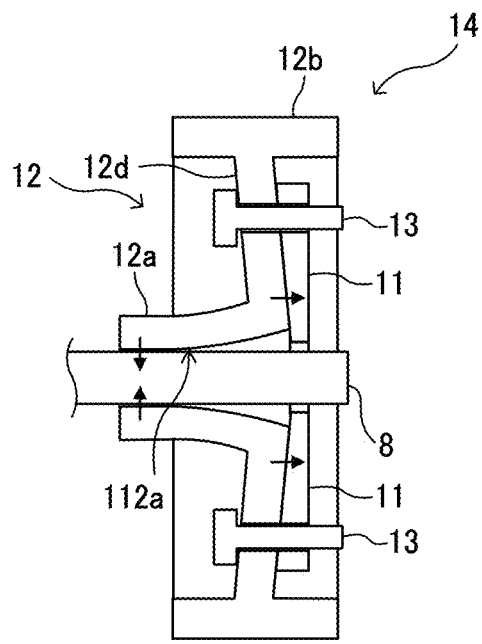

FIGS. 8A and 8B are diagrams, each illustrating a schematic configuration of the drive transmitter 14 of Variation 2.

Specifically, FIG. 8A illustrates a schematic configuration of the drive transmitter 14 prior to the fastening of the resin gear 12 and the reinforcement member 11, and FIG. 8B illustrated a schematic configuration of the drive transmitter 14 after the fastening of the resin gear 12 and the reinforcement member 11.

As illustrated in FIGS. 8A and 8B, the reinforcement member 11 of the drive transmitter 14 of Variation 2 has an opposing face 11*c* that faces the opposing wall 12*d* of the resin gear 12. The opposing face 11*c* of the reinforcement member 11 is a sloped face inclined to be farther away from the opposing wall 12*d* toward the rotary shaft 8.

As in the above-described embodiment, the drive transmitter 14 of Variation 2 has the space S between the opposing wall 12d of the resin gear 12 and the reinforcement member 11 with respect to the rotary shaft 8, prior to fastening of the resin gear 12 and the reinforcement member 11. Due to the space S, as illustrated in FIG. 8B, the opposing wall 12d after the fastening deforms following the reinforcement member 11, the diameter of the hollow tube 12a at the opposite end portion of the hollow tube 12a with respect to the reinforcement member 11 in the fastening direction (axial direction) is reduced, and then the inner circumferential surface of the hollow tube 12a at the opposite end portion of the hollow tube 12a with respect to the reinforcement member 11 in the fastening direction (axial direction) is pressed against the rotary shaft 8.

Note that both the opposing face 11c of the reinforcement member 11 facing the opposing wall 12d and an opposing face of the opposing wall 12d facing the reinforcement member 11 may be inclined with respect to the direction to be farther away from the respective opposing members toward the rotary shaft 8. As in the above-described embodiment and variation, the drive transmitter 14 having this configuration has the space S between the opposing wall 12d of the resin gear 12 and the reinforcement member 11 with respect to the rotary shaft 8, prior to fastening of the resin gear 12 and the reinforcement member 11. Further, the diameter of the hollow tube 12a at the opposite end portion of the hollow tube 12a with respect to the reinforcement member 11 in the fastening direction (axial direction) is reduced, and then the inner circumferential surface of the hollow tube 12a at the opposite end portion of the hollow tube 12a with respect to the reinforcement member 11 in the fastening direction (axial direction) is pressed against the rotary shaft 8, after the fastening of the resin gear 12 and the reinforcement member 11.

Variation 3

Figure 9A:
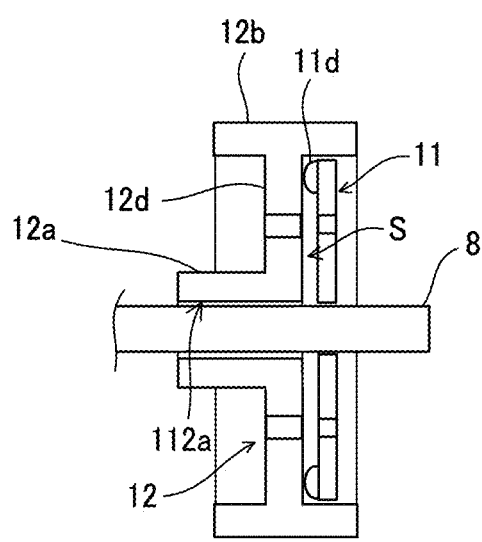
FIGS. 9A and 9B are diagrams, each illustrating a schematic configuration of a drive transmitter of Variation 3.
Figure 9B:
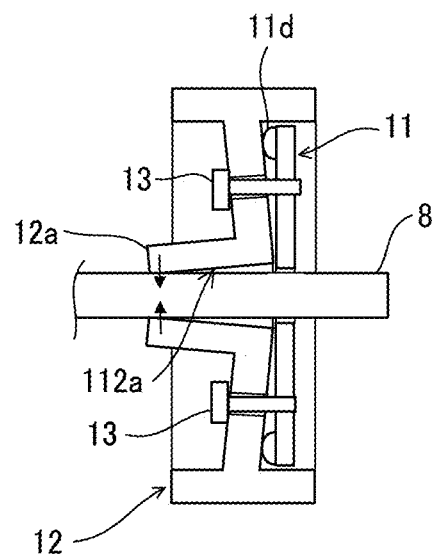

FIGS. 9A and 9B are diagrams, each illustrating a schematic configuration of the drive transmitter 14 of Variation 3. Specifically, FIG. 9A illustrates a schematic configuration of the drive transmitter 14 prior to the fastening of the resin gear 12 and the reinforcement member 11, and FIG. 9B illustrated a schematic configuration of the drive transmitter 14 after the fastening of the resin gear 12 and the reinforcement member 11.

The drive transmitter 14 of Variation 3 has projections 11d at the end portion of the reinforcement member 11 with respect to the gear portion 12b of the resin gear 12. Each projection 11d protrudes toward the opposing wall 12d of the resin gear 12.

As in the above-described embodiment and variations, the drive transmitter 14 of Variation 3 has the space S between the opposing wall 12d of the resin gear 12 and the reinforcement member 11 with respect to the rotary shaft 8, prior to fastening of the resin gear 12 and the reinforcement member 11. Due to the space S, as illustrated in FIG. 8B, the opposing wall 12d after the fastening deforms following the reinforcement member 11, the diameter of the hollow tube 12a at the opposite end portion of the hollow tube 12a with respect to the reinforcement member 11 in the fastening direction (axial direction) is reduced, and then the inner circumferential surface of the hollow tube 12a at the opposite end portion of the hollow tube 12a with respect to the reinforcement member 11 in the fastening direction (axial direction) is pressed against the rotary shaft 8.

Further, as in the above-described embodiment and variations, the drive transmitter of Variation 3 restrains deformation of the gear portion 12b of the resin gear 12 toward the reinforcement member 11, prior to the fastening. Due to such a configuration, the gear portion 12b of the resin gear 12 is restrained from deformation.

Note that, even though the projection is disposed on the reinforcement member 11 in Variation 3, the projection may be disposed on the gear portion 12b of the opposing wall 12d of the resin gear 12.

Variation 4

Figure 10A:
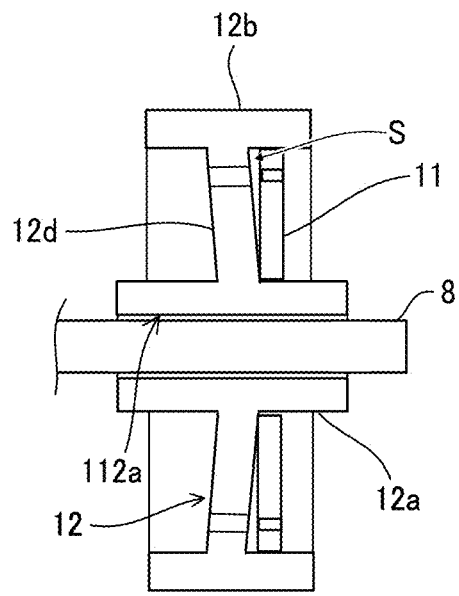
FIGS. 10A and 10B are diagrams, each illustrating a schematic configuration of a drive transmitter of Variation 4.
Figure 10B:
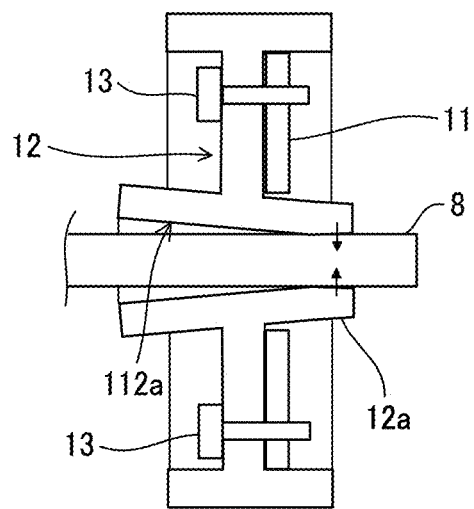

FIGS. 10A and 10B are diagrams, each illustrating a schematic configuration of the drive transmitter 14 of Variation 4. Specifically, FIG. 10A illustrates a schematic configuration of the drive transmitter 14 prior to the fastening of the resin gear 12 and the reinforcement member 11, and FIG. 10B illustrated a schematic configuration of the drive transmitter 14 after the fastening of the resin gear 12 and the reinforcement member 11.

As illustrated in FIGS. 10A and 10B, the resin gear 12 of the drive transmitter 14 of Variation 4 has the opposing wall 12d that is inclined with respect to the direction away from the reinforcement member 11 toward the gear portion 12b. Further, in Variation 4, the hollow tube 12a is extended over the opposing wall 12d toward the reinforcement member 11. The hollow tube 12a of Variation 4 has cutouts in the extended portion in the circumferential direction of the resin gear 12. The width of each cutout in the extended portion of the hollow tube 12a of the resin gear 12 is greater than the width of each pin engagement portion 11b of the reinforcement member 11. Due to such a configuration, when the parallel pin 8a is engaged with the pin engagement portion 11b, the hollow tube 12a is prevented from contacting the parallel pin 8a from the rotational direction.

As illustrated in FIG. 10A, the drive transmitter 14 of Variation 4 has the space S near the gear portion 12b prior to the fastening of the resin gear 12 and the reinforcement member 11. Further, as illustrated in FIG. 10A, the reinforcement member 11 faces the opposing wall 12d of the resin gear 12 so that the hollow tube 12a of the resin gear 12 passes through the through-hole 11a of the reinforcement member 11. Further, the radial outer end portion of the reinforcement member 11 is in contact with the inner circumferential surface of the gear portion 12b having a cylindrical shape. That is, prior to the fastening of the first member and the second member, the reinforcement member 11 and the resin gear 12 contact with each other in the fastening direction at a contact portion located radially away from the fastening portion.

In Variation 4, as the reinforcement member 11 is fastened to the resin gear 12 with the screws 13, the opposing wall 12d follows the reinforcement member 11, deforming the resin gear 12. By so doing, as illustrated in FIG. 10B, the diameter of the hollow tube 12a at the end portion of the resin gear 12 with respect to the reinforcement member 11 is reduced. Accordingly, the inner circumferential surface of the hollow tube 12a at the end portion with respect to the reinforcement member 11 is pressed against the rotary shaft 8.

In addition, since the opposing wall 12d of the resin gear 12 near the gear portion 12b deforms largely, it is likely that the gear portion 12b at the end portion of the gear portion 12b of the resin gear 12 with respect to the reinforcement member 11 is deformed to reduce the diameter of the gear portion 12b, according to the deformation of the resin gear 12. However, in Variation 4, the radial outer end portion of the reinforcement member 11 is in contact with the inner circumferential surface of the gear portion 12b having a cylindrical shape. Due to this configuration, the reinforcement member 11 prevents the end portion of the gear portion 12*b* of the resin gear 12 with respect to the reinforcement member 11, from deforming to reduce the diameter of the gear portion 12*b* of the resin gear 12.

Variation 5

Figure 11A:
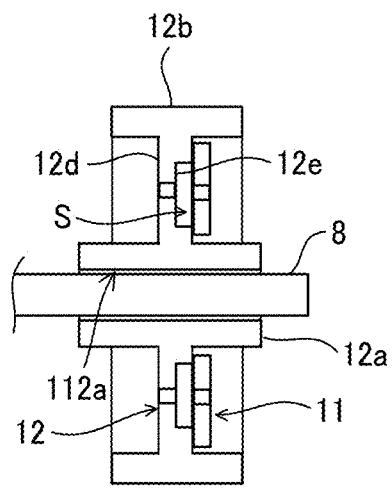
FIGS. 11A and 11B are diagrams, each illustrating a schematic configuration of a drive transmitter of Variation 5.
Figure 11B:
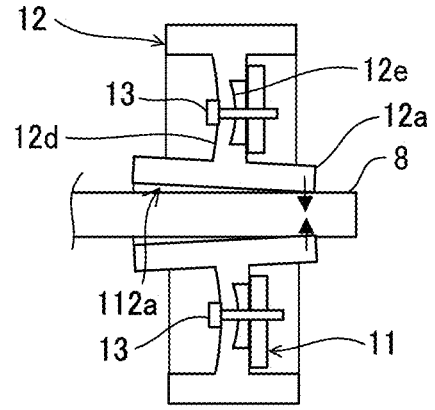

FIGS. 11A and 11B are diagrams, each illustrating a schematic configuration of the drive transmitter 14 of Variation 5. Specifically, FIG. 11A illustrates a schematic configuration of the drive transmitter 14 prior to the fastening of the resin gear 12 and the reinforcement member 11, and FIG. 11B illustrated a schematic configuration of the drive transmitter 14 after the fastening of the resin gear 12 and the reinforcement member 11.

As illustrated in FIGS. 11A and 11B, the resin gear 12 of the drive transmitter 14 of Variation 5 has a groove 12*e* in the opposing face of the opposing wall 12*d* of the resin gear 12 with respect to the reinforcement member 11. As illustrated in FIG. 11A, the groove 12*e* functions as a space between the opposing wall 12*d* of the resin gear 12 and the reinforcement member 11, prior to the fastening of the resin gear 12 and the reinforcement member 11. Further, screw through-holes are formed in the bottom of the groove 12*e* so that the screws 13 pass through the screw through-holes. In addition, the space S is provided in a portion at which the resin gear 12 and the reinforcement member 11 are fastened to each other with the screws 13. The hollow tube 12*a* in Variation 5 has the shape similar to the hollow tube 12*a* in Variation 4.

In Variation 5, as the reinforcement member 11 is fastened to the resin gear 12 with the screws 13, the radial center portion of the opposing wall 12*d* that is pressed by the heads of the screws 13 deforms to dent toward the reinforcement member 11. Due to the deformation of the opposing wall 12*d*, as illustrated in FIG. 11B, the end portion of the hollow tube 12*a* with respect to the reinforcement member 11 is deformed to reduce the diameter of the resin gear 12, and the inner circumferential surface at the end portion of the hollow tube 12*a* with respect to the reinforcement member 11 is pressed against the rotary shaft 8.

Figure 12A:
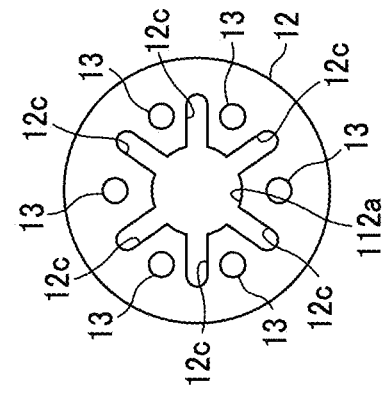
FIGS. 12A, 12B, and 12C are diagrams, each illustrating a configuration example of slits.
Figure 12B:
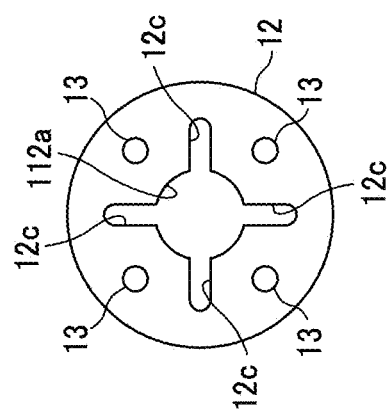
Figure 12C:
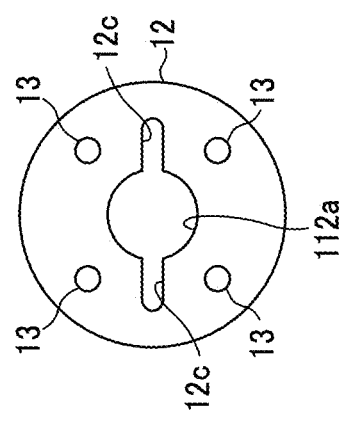

FIGS. 12A, 12B, and 12C are diagrams, each illustrating a configuration example of slits.

Note that the configurations of the drive transmitter of the above-described embodiment and variations have slits at intervals of 90 degrees in the rotational direction, as illustrated in FIG. 12B. However, the number and positions of slits are not limited to the configurations of the above-described embodiment and variations. For example, as illustrated in FIG. 12A, the slits may be provided at intervals of 180 degrees in the rotational direction. Further, as illustrated in FIG. 12C, the slits may be provided at intervals of 60 degrees in the rotational direction. Having a greater number of slits is preferable to weaken the rigidity of the hollow tube, so that the diameter at one end of the hollow tube is easily reduced. Further, having a greater number of slits is more preferable to reduce the diameter of the hollow tube in a state in which one end of the hollow tube is maintained in a rounder shape, and therefore the one end of the hollow tube 12*a* is evenly pressed against the rotary shaft. Further, in the configuration illustrated in FIG. 12C, the resin gear and the reinforcement member are fastened to each other with screws at six (6) positions. By so doing, the hollow tube 12*a* is preferably deformed more evenly.

Further, the drive device described above drives the intermediate transfer belt 61 but the configuration of the drive device is not limited to the configuration. The drive transmitter according to the present disclosure may be applied to, for example, a drive device that drives a photoreceptor, a drive device that drives a secondary transfer roller, a drive device that drives a fixing roller, a drive device that drives a pair of conveyance rollers.

The configurations described above are examples, and aspects of the present disclosure provide respective effects as follows.

Aspect 1

The drive transmitter (for example, the drive transmitter 14) includes a first member (for example, the resin gear 12) and a second member (for example, the reinforcement member 11). The first member includes an opening (for example, the through-hole 112*a*) through which a rotary shaft (the rotary shaft 8) passes, a wall (for example, the opposing wall 12*d*) disposed orthogonal to an axial direction of the first member, and a drive transmitting portion (for example, the gear portion 12*b*) by which a driving force is transmitted. The second member has a rigidity greater than the first member and is configured to be fastened to the wall of the first member. A space (for example, the space S) is configured to be between the second member and the wall of the first member, with the first member and the second member being overlaid in a fastening direction of the second member, prior to fastening of the first member and the second member. At least a part of the wall of the first member defining the space with the second member is configured to shift toward the second member to reduce a diameter of at least a part of the opening of the first member at the fastening of the first member and the second member.

According to this configuration, by fastening the first member to the second member, the first member is deformed to reduce the diameter of at least a part of the opening. Therefore, the fastening force of the fastening member (for example, the screws 13) is adjusted to adjust the inner diameter dimension of the opening. For example, in a case in which the portion having the smallest diameter of the inner diameter of the opening when fastening the first member to the second member is smaller than the dimension capable of being lightly press-fitted, by loosening fastening of the fastening member, the diameter of the through-hole is relaxed to make the measurements to be lightly press-fitted. Accordingly, adjustment of the fastening force adjusts the inner diameter of the opening (through-hole). Therefore, without forming the inner diameter of the opening with accuracy, the drive transmitter 14 is lightly press-fitted so that the manufacturing cost is decreased.

Aspect 2

According to Aspect 1, the wall (for example, the opposing wall 12*d*) of the first member (for example, the resin gear 12) has a first face (for example, the opposing face 112*d*) that faces the second member in the fastening direction, the second member (for example, the reinforcement member 11) has a second face (for example, the opposing face 11*c*) that faces the wall of the first member in the fastening direction, and at least one of the first face and the second face has a slanted face inclining with respect to the fastening direction.

According to this configuration, as described in Variation 2 and Variation 3, the first member is deformed to reduce the diameter of at least a part of the through-hole 11*a* at the fastening of the first member and the second member.

Aspect 3

According to Aspect 2, the slanted face inclines to be farther away from the second member (for example, the reinforcement member 11) or the wall (for example, the opposing wall 12*d*) of the first member (for example, the resin gear 12), toward the rotary shaft (for example, the rotary shaft 8).

According to this configuration, as described in the embodiments above, the space (for example, the space S)

prior to the fastening of the first member and the second member is generated with respect to the rotary shaft 8, and therefore deformation of the drive transmitting portion (for example, the gear portion 12b) is restrained at the fastening of the first member and the second member.

Aspect 4

According to Aspect 2 or Aspect 3, the wall (for example, the opposing wall 12d) of the first member (for example, the resin gear 12) is inclined with respect to the fastening direction.

According to this configuration, the opposing face is brought to be inclined.

Aspect 5

According to any one of Aspects 1 to 4, the space (for example, the space S) is given at a fastening portion at which the second member (for example, the reinforcement member 11) is fastened to the first member (for example, the resin gear 12).

According to this configuration, as described in Variation 5, the first member is deformed to narrow the space with the fastening force of the fastening member (for example, the screws 13), and therefore the diameter of the opening (for example, the through-hole 112a) is reduced.

Aspect 6

According to any one of Aspects 1 to 5, the first member (for example, the resin gear 12) and the second member (for example, the reinforcement member 11) are fastened at a fastening portion, and the second member and the wall (for example, the opposing wall 12d) of the first member contact with each other in the fastening direction at a contact portion located radially away from the fastening portion, prior to the fastening of the first member and the second member.

According to this configuration, as described in Variation 3, deformation of the drive transmitting portion (for example, the gear portion 12b) is restrained.

Aspect 7

According to any one of Aspects 1 to 6, the first member (for example, the resin gear 12) includes a hollow tube (the hollow tube 12a) having the opening (for example, the through-hole 112a), and the hollow tube of the first member has a slit (the slits 12c) or a cutout.

According to this configuration, as described in the above-described embodiments, the diameter of the opening is easily reduced at the fastening of the first member and the second member (for example, the reinforcement member 11).

Aspect 8

According to any one of Aspects 1 to 7, the second member (for example, the reinforcement member 11) has a through-hole (for example, the through-hole 11a) through which the rotary shaft (for example, the rotary shaft 8) passes.

Aspect 9

In Aspect 9, a drive device (for example, the drive device 20) includes a drive source (for example, the drive motor 10), and the drive transmitter (for example, the drive transmitter 14) according to any one of Aspects 1 to 8. The drive transmitter is configured to transmit a drive force of the drive source.

According to this configuration, an increase in the cost of the drive device is restrained.

Aspect 10

In Aspect 10, an image forming apparatus (for example, the image forming apparatus 200) includes the drive device according to Aspect 9 and a driven target body (for example, the intermediate transfer belt 61) configured to be drive by the drive device.

According to this configuration, a reduction in cost of the image forming apparatus is enhanced.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A drive transmitter comprising:
    a first member including:
        an opening through which a rotary shaft passes;
        a wall disposed orthogonal to an axial direction of the first member; and
        a drive transmitting portion by which a driving force is transmitted; and
    a second member having a rigidity greater than the first member, the second member being configured to be fastened to the wall of the first member,
    wherein a space is configured to be between the second member and the wall of the first member, with the first member and the second member being overlaid in a fastening direction of the second member, prior to fastening of the first member and the second member,
    wherein at least a part of the wall of the first member defining the space with the second member is configured to shift toward the second member to reduce a diameter of at least a part of the opening of the first member at the fastening of the first member and the second member.

2. The drive transmitter according to claim 1,
    wherein the wall of the first member has a first face that faces the second member in the fastening direction,
    wherein the second member has a second face that faces the wall of the first member in the fastening direction, and
    wherein at least one of the first face and the second face has a slanted face inclining with respect to the fastening direction.

3. The drive transmitter according to claim 2,
    wherein the slanted face inclines to be farther away from the second member or the wall of the first member, toward the rotary shaft.

4. The drive transmitter according to claim 2,
wherein the wall of the first member is inclined with respect to the fastening direction.

5. The drive transmitter according to claim 1,
wherein the space is given at a fastening portion at which the second member is fastened to the first member.

6. The drive transmitter according to claim 1,
wherein the first member and the second member are fastened at a fastening portion, and
wherein the second member and the wall of the first member contact with each other in the fastening direction at a contact portion located radially away from the fastening portion, prior to the fastening of the first member and the second member.

7. The drive transmitter according to claim 1,
wherein the first member includes a hollow tube having the opening, and
wherein the hollow tube of the first member has a slit or a cutout.

8. The drive transmitter according to claim 1,
wherein the second member has a through-hole through which the rotary shaft passes.

9. A drive device comprising:
a drive source; and
the drive transmitter according to claim 1, the drive transmitter being configured to transmit a drive force of the drive source.

10. An image forming apparatus comprising:
the drive device according to claim 9; and
a driven target body configured to be driven by the drive device.

* * * * *